(12) United States Patent
Yang (10) Patent No.: US 7,982,780 B2
(45) Date of Patent: Jul. 19, 2011

(54) PHOTOGRAPHING APPARATUS HAVING MULTIPLE CONTROL BUTTON SETS AND DISPLAYS AND METHOD OF DISPLAYING IMAGE

(75) Inventor: Hong-seok Yang, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1056 days.

(21) Appl. No.: 11/746,254

(22) Filed: May 9, 2007

(65) Prior Publication Data

US 2008/0122947 A1 May 29, 2008

(30) Foreign Application Priority Data

Nov. 29, 2006 (KR) .................. 10-2006-0119204

(51) Int. Cl.
*H04N 5/225* (2006.01)
(52) U.S. Cl. .............. 348/220.1; 348/373; 348/376
(58) Field of Classification Search .............. 348/373, 348/376, 220.1
See application file for complete search history.

(56) References Cited

U.S. PATENT DOCUMENTS

| | | | | |
|---|---|---|---|---|
| 6,272,290 B1 * | 8/2001 | Mogamiya | ................ | 396/59 |
| 6,842,193 B2 * | 1/2005 | Shimose | ................ | 348/373 |
| 7,092,627 B2 * | 8/2006 | Ushiro | ................ | 396/303 |
| 7,253,843 B2 * | 8/2007 | Lee | ................ | 348/565 |
| 7,372,504 B2 * | 5/2008 | Fujimura | ................ | 348/376 |
| 7,394,485 B2 * | 7/2008 | Kim | ................ | 348/220.1 |
| 7,405,751 B2 * | 7/2008 | Lee et al. | ................ | 348/220.1 |
| 2003/0026611 A1 * | 2/2003 | Cho | ................ | 396/332 |
| 2003/0112348 A1 * | 6/2003 | Okuley | ................ | 348/231.99 |
| 2003/0160891 A1 * | 8/2003 | Mikamo | ................ | 348/375 |
| 2003/0189661 A1 * | 10/2003 | Flach et al. | ................ | 348/333.09 |
| 2004/0169730 A1 * | 9/2004 | Tamura et al. | ................ | 348/207.2 |

* cited by examiner

*Primary Examiner* — Ngoc-Yen T Vu
(74) *Attorney, Agent, or Firm* — Stanzione & Kim, LLP (57) ABSTRACT

A photographing apparatus having a plurality of displays and a method of displaying an image. A photographing apparatus to photograph and record an image includes a lens unit, first and second photograph buttons to input commands to photograph the image, first and second zoom buttons to input zoom commands, a recording unit to record the image photographed via the lens unit, and a battery to supply a power supply voltage to the photographing apparatus. The first photograph button and the first zoom button are disposed on a front panel of the photographing apparatus, and the second photograph button and the second zoom button are disposed on a top panel of the photographing apparatus. This allows a user to more easily photograph an infant, check a photographed image, and photograph an object located in a lower position.

17 Claims, 8 Drawing Sheets

PHOTOGRAPHING APPARATUS HAVING MULTIPLE CONTROL BUTTON SETS AND DISPLAYS AND METHOD OF DISPLAYING IMAGE

CROSS-REFERENCE TO RELATED APPLICATIONS

This application claims benefit under 35 U.S.C. §119 from Korean Patent Application No. 2006-119204, filed on Nov. 29, 2006, the entire content of which is incorporated herein in its entirety by reference.

BACKGROUND OF THE INVENTION

1. Field of the Invention

The present general inventive concept relates to a photographing apparatus, and more particularly, to a photographing apparatus to photograph an object and record a generated image in a recording medium, and a method thereof.

2. Description of the Related Art

Photographing apparatuses may include digital camcorders suitable for photographing moving images and digital cameras suitable for photographing still images. Photographing infants using such a digital camcorder or camera is a very difficult task. This is because infants tend not to gaze into the digital camcorder or camera when being photographed.

Accordingly, there is a need for a photographing apparatus for allowing a user to more easily photograph infants.

Both a digital camcorder and a digital camera currently provide a photographed image to a user through a liquid crystal display (LCD) and a viewfinder. However, the use of the viewfinder makes checking the photographed image inconvenient, since the user's eyes must be very close to the viewfinder. Accordingly, the user may prefer to use the LCD rather than the viewfinder in order to check the photographed image.

There is a need for a photographing apparatus having means other than the viewfinder to show photographed images to a user.

Furthermore, a user must bend his or her legs to photograph an object located in a lower position. Accordingly, there is a need for a photographing apparatus for allowing a user to more conveniently photograph an object located in a lower position.

SUMMARY OF THE INVENTION

The present general inventive concept provides a photographing apparatus having displays and a method of displaying an image, allowing a user to more easily photograph infants, check a photographed image, and photograph an object located in a lower position.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a photographing apparatus to photograph and record an image, including a lens unit, first and second photograph buttons to input commands to photograph the image, first and second zoom buttons to input zoom commands corresponding to the image to be photographed, a recording unit to record the image photographed via the lens unit, and a battery to supply a power supply voltage to the photographing apparatus, wherein the first photograph button and the first zoom button are disposed on a front panel of the photographing apparatus, and the second photograph button and the second zoom button are disposed on a top panel of the photographing apparatus.

The apparatus may further include a third photograph button to input the command to photograph the image. The third photograph button is disposed on a rear panel of the photographing apparatus.

The first photograph button may be a button to input commands to photograph a moving image and a still image, the second photograph button may be a button to input a command to photograph the still image, and the third photograph button may be a button to input a command to photograph the moving image.

The apparatus may further include a button to input a command to display information on at least one of an amount of the battery and an amount of a recording medium to record the photographed image.

The foregoing and/or other aspects and utilities of the present general inventive concept may also be achieved by providing a photographing apparatus to photograph and record a moving image and a still image, including a lens unit, first and second photograph buttons to input commands to photograph the image, first and second zoom buttons to input zoom commands corresponding to the image to be photographed, a recording unit to record the image photographed via the lens unit, a mode selecting unit to select either a moving-image photographing mode to photograph the moving image or a still-image photographing mode to photograph the still image, and a battery to supply a power supply voltage to the photographing apparatus, wherein the first photograph button and the first zoom button are disposed on a front panel of the photographing apparatus, and the second photograph button and the second zoom button are disposed on a top panel of the photographing apparatus.

The foregoing and/or other aspects and utilities of the present general inventive concept may also be achieved by providing a photographing apparatus to photograph and record an image, including a lens unit, first and second displays to display an image photographed via the lens unit, a recording unit to record the image photographed via the lens unit, and a battery to supply a power supply voltage to the photographing apparatus, wherein the first and second displays are Liquid Crystal Displays (LCDs), and the second display is rotatable.

The first display may be rotatable.

The foregoing and/or other aspects and utilities of the present general inventive concept may also be achieved by providing a photographing apparatus to photograph and record an image, including a lens unit, first and second displays to display an image photographed via the lens unit, a memory to record the image photographed via the lens unit, a loader to record the image photographed via the lens unit on a disk, a recording medium interface to record the image photographed via the lens unit on a detachable recording medium, a battery to supply a power supply voltage to the photographing apparatus, and a selecting unit to select any one of the memory, the disk and the detachable recording medium to record the photographed image.

The apparatus may further include an input unit to input a command to copy an image from any one of the memory, the disk, and the detachable recording medium to another.

The foregoing and/or other aspects and utilities of the present general inventive concept may also be achieved by providing a photographing apparatus to photograph and record an image, including a lens unit, first and second displays to display an image photographed via the lens unit, a recording unit to record the image photographed via the lens unit, a battery to supply a power supply voltage to the photographing apparatus, and a selecting unit to select any one of a plurality of photographing modes of the photographing apparatus.

The plurality of photographing modes may include a first mode to display an image on the first and second displays, a second mode not to display the image on the first display and to display the image on the second display, and a third mode to display the image on the first display and not to display the image on the second display.

The first mode may include a first sub-mode to display the photographed image on the first and second displays, and a second sub-mode to display an image in a recording medium on the first display and the photographed image on the second display.

The foregoing and/or other aspects and utilities of the present general inventive concept may also be achieved by providing a photographing apparatus, including a first display to display a first image, a second display to display a second image, and a back-end unit to send the first image captured through photographing to the first display so that the first image is displayed on the first display and sending the second image recorded in a recording medium to the second display so that the second image is displayed on the second display.

The second image may be an image recorded on any one of a built-in memory, a mounted disk, and a mounted memory card.

The apparatus may further include a memory to store graphics used by the back-end unit upon performing on screen display (OSD) processing on the first image, and the back-end unit performs OSD processing to contain any one of the graphics recorded in the memory into the first image and sends a resultant image to the second display.

A screen size of a graphic contained into the first image by OSD processing may be the same as that of the second display.

The first display may be located so that a photographer views the image displayed on the first display, and the second display may be located so that a person being photographed views the image displayed on the second display.

The back-end unit may send the second image to the second display when it is determined that the second display is located so that the person being photographed views the image displayed on the second display.

The second display may have a larger screen than the first display.

The foregoing and/or other aspects and utilities of the present general inventive concept may also be achieved by providing a method of displaying an image in a photographing apparatus including first and second displays to display an image, the method including a first displaying operation of displaying a first photographed image on the first display, and a second displaying operation of displaying a second image recorded in a recording medium on the second display.

The second image may be an image recorded on any one of a built-in memory, a mounted disk, and a mounted memory card.

The second displaying operation may include performing OSD processing to contain one of graphics into the first image and displaying a resultant image on the second display.

A screen size of a graphic contained into the first image by OSD processing may be the same as that of the second display.

The first display may be located so that a photographer views the image displayed on the first display, and the second display is located so that a person being photographed views the image displayed on the second display.

The second displaying operation may display the second image on the second display when it is determined that the second display is located so that the a person being photographed views the image displayed on the second display.

The second display may have a larger screen than the first display.

The foregoing and/or other aspects and utilities of the present general inventive concept may also be achieved by providing a photographing apparatus, including a lens unit to photograph an object, first and second zoom buttons to perform zooming functions on the object, first and second photograph buttons to allow a user to perform the photographing of the object, a first display to display the photographed object as a first image, and a second display to display a second image.

The first photograph button and the first zoom button may be disposed on a front panel of the photographing apparatus, and the second photograph button and the second zoom button may be disposed on a top panel of the photographing apparatus.

The second image may be an image of the photographed object.

The second image may not be an image of the photographed object.

The second display may be rotatable to face the object being photographed.

The first display and the second display may both be Liquid Crystal Displays (LCDs).

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1A:
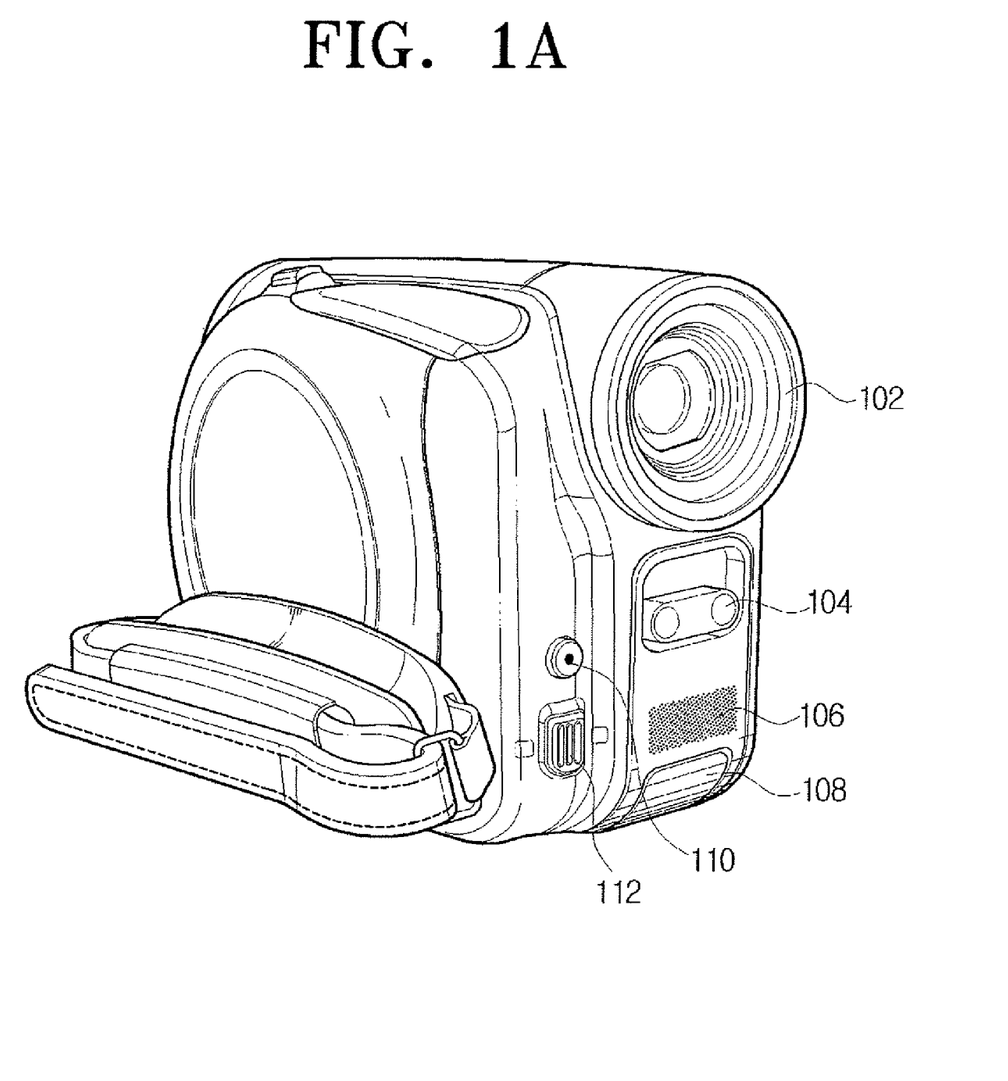
FIGS. 1A to 1F are perspective views illustrating a digital camcorder according to an embodiment of the present general inventive concept.

FIG. 1A is a perspective view illustrating front and right panels of a digital camcorder according to an embodiment of the present general inventive concept. A lens unit 102 used to photograph an object, a flash 104 to illuminate the object, an internal microphone 106 to acquire an external sound, and a front cover 108 are disposed on the front panel of the digital camcorder, as illustrated in FIG. 1A.

A power supply voltage supply terminal (not illustrated) to supply a charging power supply voltage, and an external microphone connection terminal (not illustrated) to connect the digital camcorder to an external microphone are disposed inside the front cover 108.

A first photograph button 110 to input moving-image and still-image photographing commands is further disposed on the front panel of the digital camcorder.

A user can input different photographing commands by pressing the first photograph button 110 for a longer or shorter period of time. In other words, when the user presses the first photograph button 110 for a longer period of time, a moving-image photographing command is input, and when the user presses the first photograph button 110 for a shorter period of time, a still-image photographing command is input.

In addition, the user can input different photographing commands by selecting other photographing modes through a photographing-mode select switch 146 (see FIG. 1C), which will be described below. In other words, when the user presses the first photograph button 110, a moving-image photographing command is input when the photographing mode selected through the photographing-mode select switch 146 is the moving-image photographing mode, and the still-image photographing command is input when the photographing mode selected through the photographing-mode select switch 146 is the still-image photographing mode.

A first zoom button 112 to input a zoom-in/zoom-out command is further disposed on the front panel of the digital camcorder.

Figure 1B:
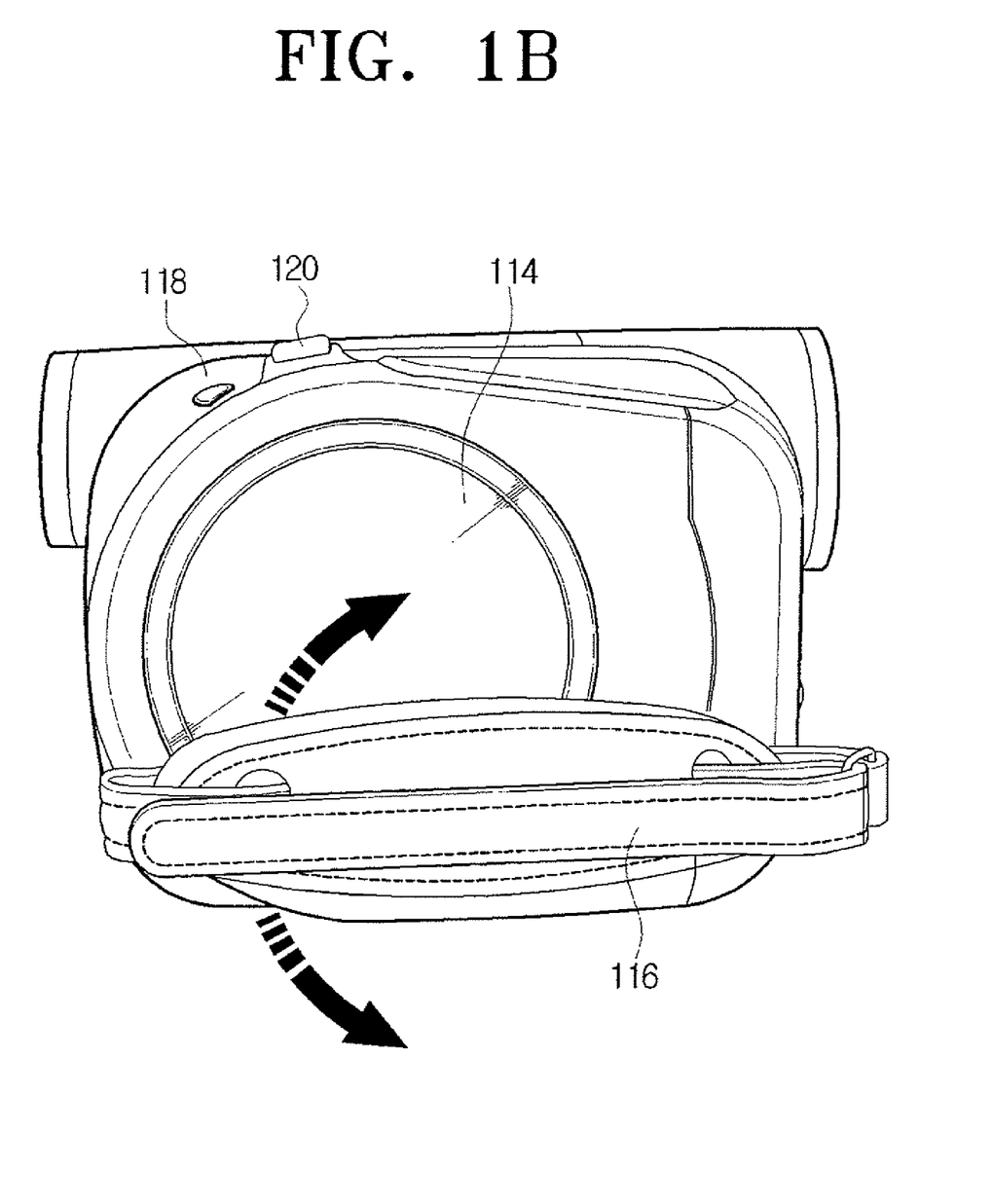

FIG. 1B is a perspective view illustrating a right panel of a digital camcorder according to an embodiment of the present general inventive concept. Referring to FIG. 1B, a disk cover 114 and a rotatable hand grip 116 are disposed on the right panel of the digital camcorder. A space and mechanism to mount a disk are disposed inside the disk cover 114. The rotatable hand grip 116 can be rotated in a direction indicated by an arrow illustrated in FIG. 1B.

A second photograph button 118 to input the still-image photographing command and a second zoom button 120 to input the zoom-in/zoom-out command are disposed on a top panel of the digital camcorder, as illustrated in FIG. 1B.

Figure 1C:
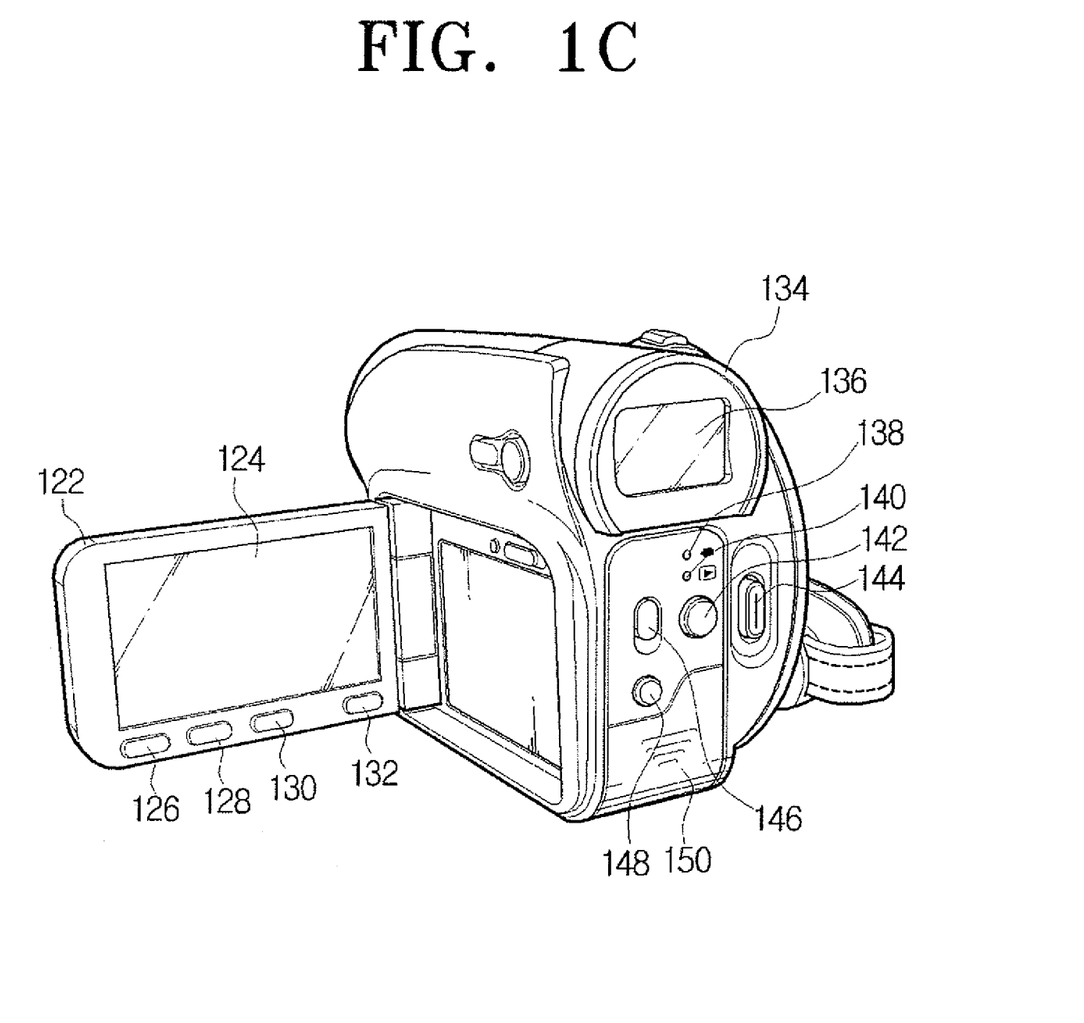

FIG. 1C is a perspective view illustrating rear and left panels of the digital camcorder according to an embodiment of the present general inventive concept. Referring to FIG. 1C, a main-LCD (Liquid Crystal Display) panel 122 is disposed on the left panel of the digital camcorder, and includes a main-LCD 124, shortcut buttons 126, 128 and 130 to activate shortcut functions, and a display button 132 to input a command to display on screen display (OSD) information.

A sub-LCD panel 134 is disposed on the rear panel of the digital camcorder rear, as illustrated in FIG. 1C, and includes a sub-LCD 136. The sub-LCD 136 has a screen which is smaller than the main-LCD 124.

As illustrated in FIG. 1C, LEDs 138 and 140 to indicate operation states of the digital camcorder, an easy Q button 142 to uniformly produce excellent shots under various conditions, a third photograph button 144 to input the moving-image photographing command, a photographing-mode select switch 146 to input the photographing-mode select command, a power button 148 to input a power on/off command, and a rear cover 150 are further disposed on the rear panel of the digital camcorder. Photographing modes, which can be selected through the photographing-mode select switch 146, may include the moving-image photographing mode, and the still-image photographing mode.

When the easy Q button 142 is pressed once, it automatically sets an auto stabilization function, an auto focus function, an auto white balance function, and an auto exposure function, which allows less-experienced photographers to more easily photograph an object.

A multi-slot (not illustrated) into which various memory cards are mounted, a Universal Serial Bus (USB) terminal (not illustrated) corresponding to a USB interface, and an AV output terminal (not illustrated) to output audio and video signals to an external device are disposed inside the rear cover 150.

Figure 1D:
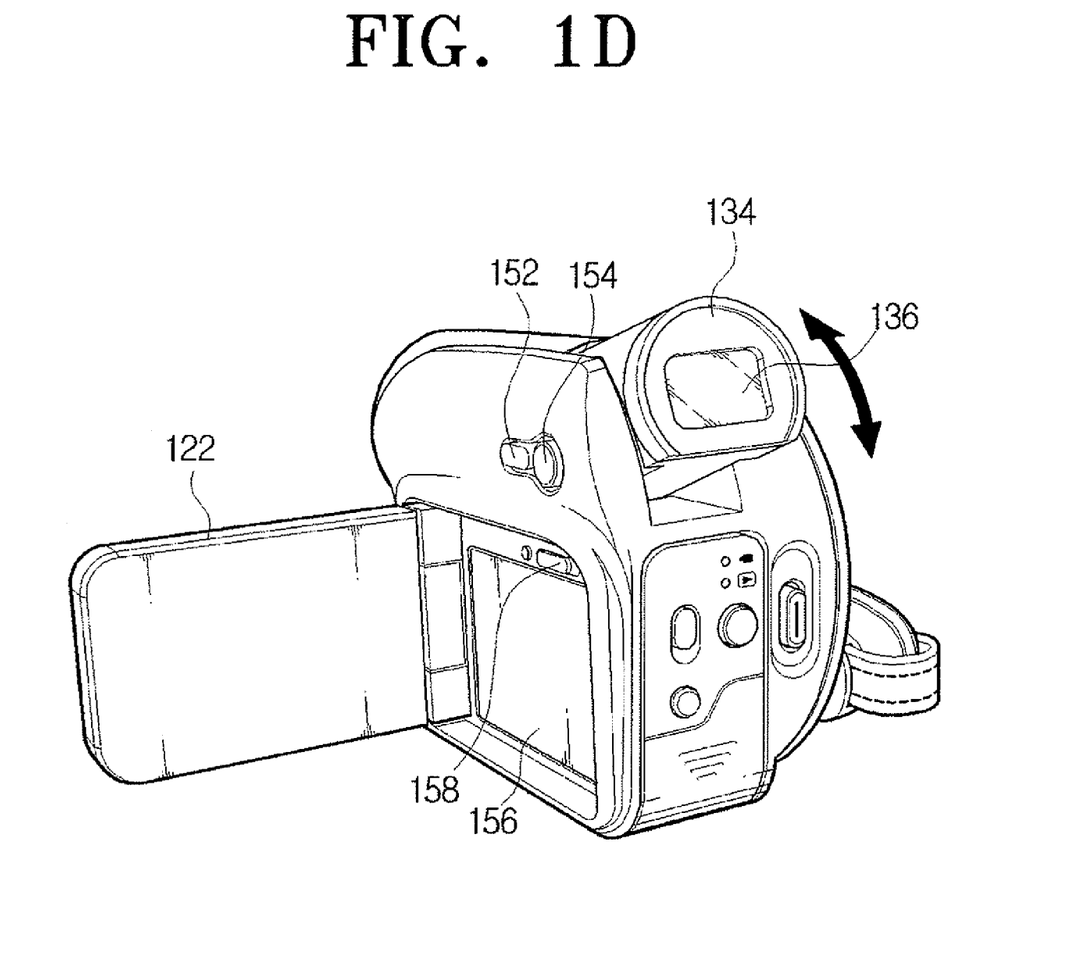

Meanwhile, as illustrated in FIG. 1D, the main-LCD panel 122 is rotatable to allow the main-LCD 124 to face forward (i.e., a subject being photographed can view the image which is displayed on the main-LCD 124 of the main-LCD panel 122).

Further, the sub-LCD 136 on the sub-LCD panel 134 can face backward to allow the photographer to view an image which is displayed on the sub-LCD 136. The sub-LCD panel 134 is movable (rotatable) in a direction indicated by an arrow illustrated in FIG. 1D. Accordingly, even when the digital camcorder is located in a lower position than the eyes of the photographer, the photographer can view the image displayed on the sub-LCD 136.

A Q check (Quick check) button 152, a copy button 154, and a battery detaching switch 158 to detach a battery 156 to supply a power supply voltage to the digital camcorder are disposed on the left panel of the digital camcorder, as illustrated in FIG. 1D.

The Q check button 152 allows a user to input a command to display information on an amount of the battery 156, an amount of the recording medium, etc., on the sub-LCD 136.

The copy button 154 is used to input a command to copy a file from any one of a plurality of built-in and/or mounted thereon recording media of the digital camcorder (built-in flash memory, disk, and memory card) to another recording medium.

The first photograph button 110 and the first zoom button 112 of FIG. 1A, the second photograph button 118 and the second zoom button 120 of FIG. 1B, and the third photograph button 144 of 1C all function to input the photographing command and/or the zoom command, but are located in different positions on the digital camcorder.

In other words, the first photograph button 110 and the first zoom button 112 are disposed on the front panel of the digital camcorder, the second photograph button 118 and the second zoom button 120 are disposed on the top panel of the digital camcorder, and the third photograph button is disposed on the rear panel of the digital camcorder.

Providing multiple buttons which perform equivalent functions on the front panel, the top panel, or the rear panel" of the digital camcorder allows the user to grip the digital camcorder in two different ways.

Figure 1E:
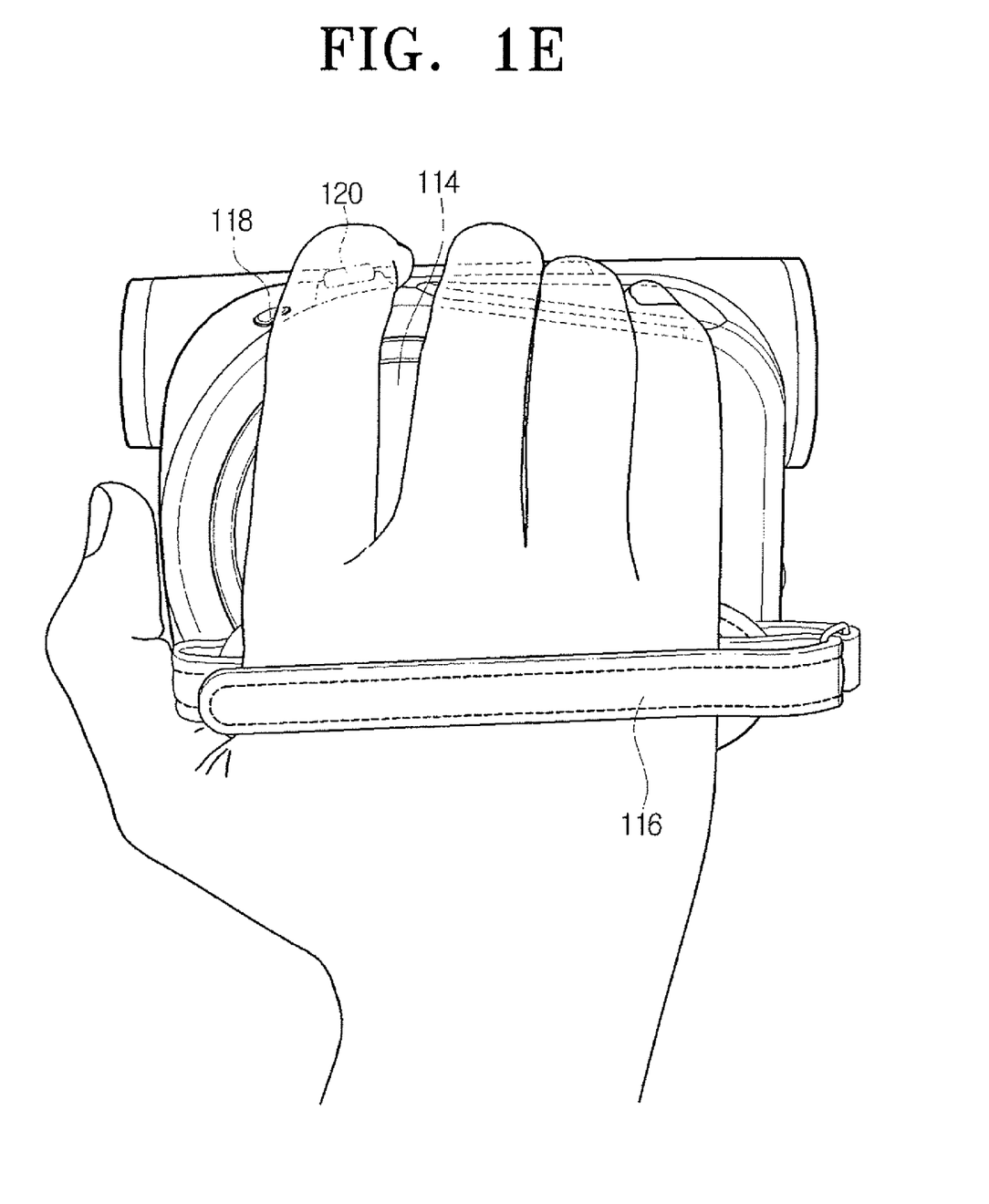

The user may grip the digital camcorder so that the user's fingers face upward as illustrated in FIG. 1E. This grip is suitable to photograph an object which is located in a higher position (e.g., an adult).

When the user grips the digital camcorder as illustrated in FIG. 1E, the user's index finger may be placed on the second photograph button 118 or the second zoom button 120, which are disposed in the top panel of the digital camcorder, and a user's thumb may be placed on the third photograph button 144, which is disposed on the rear panel of the digital camcorder. Accordingly, the user can conveniently operate the second photograph button 118 and the second zoom button 120 with the index finger, and the user can operate the third photograph button 144 with the thumb.

Figure 1F:
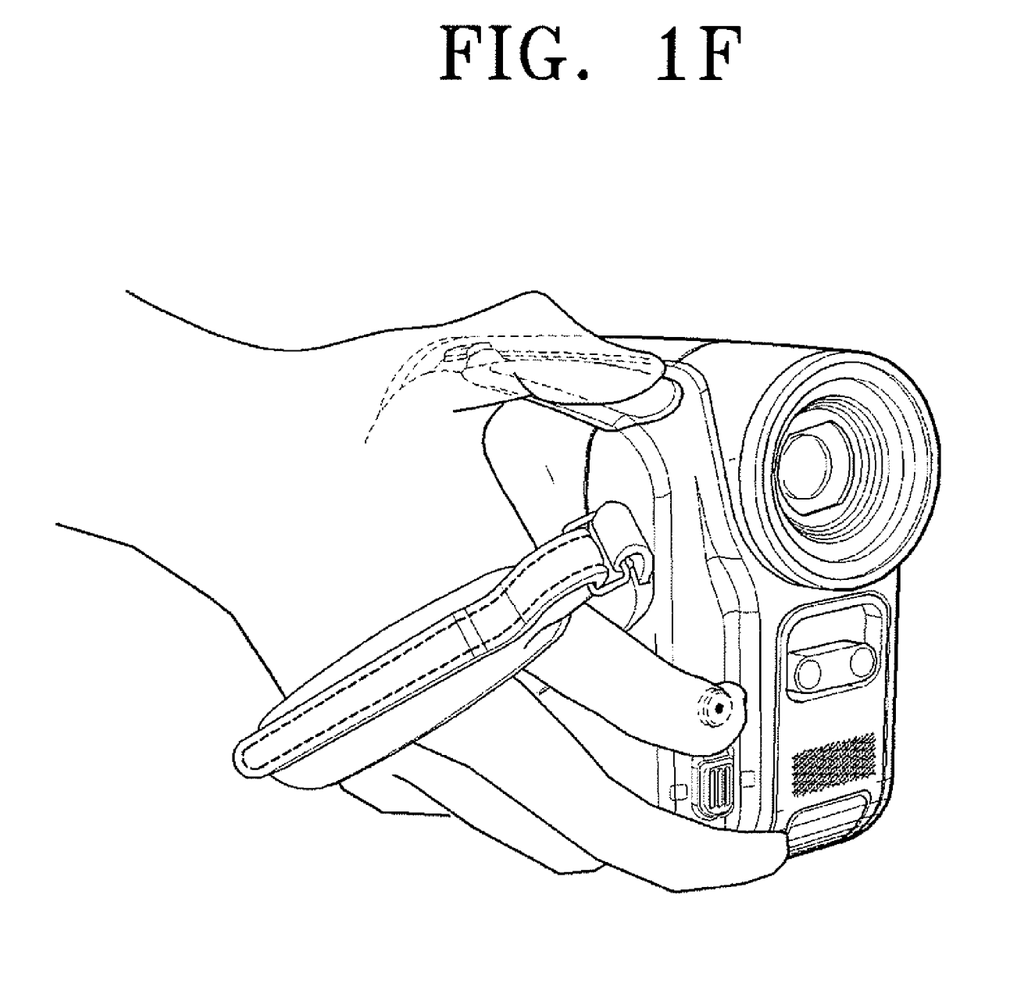

The user may also grip the digital camcorder so that the user's fingers face downward as illustrated in FIG. 1F. This grip is suitable to photograph an object which is located in a lower position (e.g., an infant). This grip also allows the user to photograph an object located in a lower position without requiring the user to have bent legs.

When the user grips the digital camcorder as illustrated in FIG. 1F, the user's index finger is placed on the first photograph button 110 or the first zoom button 112, which are disposed on the front panel of the digital camcorder. Accordingly, the user can conveniently operate the first photograph button 110 or the first zoom button 112 using the index finger, which is the finger that is most accustomed to operate buttons.

Meanwhile, the rotatable hand grip 116 can be rotated in the direction indicated by the arrow illustrated in FIG. 1B, as previously described. This allows the user to grip the camcorder in the position as illustrated in FIG. 1F, instead of the position as illustrated in FIG. 1E, without actually changing a hand position corresponding to the rotatable hand grip 116.

The user may also grip the camcorder in the position as illustrated in FIG. 1E, instead of the position as illustrated in FIG. 1F without changing the hand position corresponding to the rotatable hand grip 116.

Figure 2:
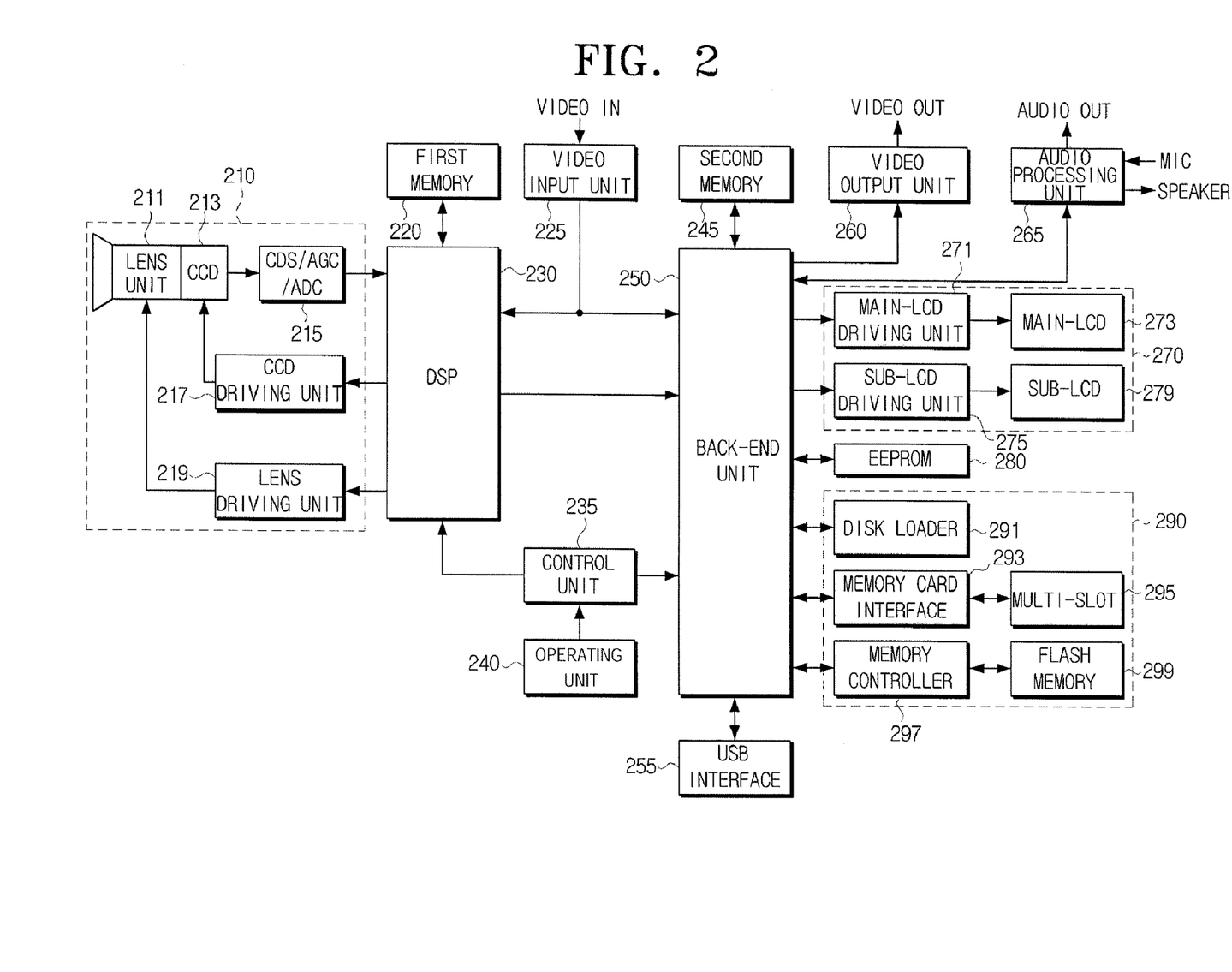
FIG. 2 is a block diagram of the digital camcorder according to an embodiment of the present general inventive concept.

FIG. 2 is a block diagram illustrating the digital camcorder according to the present embodiment.

As illustrated in FIG. 2, the digital camcorder according to the present embodiment includes a photographing unit 210, a first memory 220, a video input unit 225, a Digital Signal Processor (DSP) 230, a control unit 235, an operating unit 240, a second memory 245, a back-end unit 250, a USB interface 255, a video output unit 260, an audio processing unit 265, a multi-LCD 270, an Electrically Erasable and Programmable Read Only Memory (EEPROM) 280, and a recording unit 290.

The photographing unit 210 converts an optical signal input via the lens into an electric signal and performs signal processing on the electric signal. The photographing unit 210 includes a lens unit 211, a Charge Coupled Device (CCD) 213, a Correlated Double Sampler/Auto Gain Controller/Analog-to-Digital converter (CDS/AGC/ADC) 215, a CCD driving unit 217, and a lens driving unit 219.

The lens unit 211 projects an optical image of an object onto an optical surface of the CCD 213, which will be described below. This lens unit 211 corresponds to the lens unit 102 illustrated in FIG. 1.

The lens driving unit 219 drives the lens unit 211. Specifically, the lens driving unit 219 drives the lens unit 211 with a zoom motor (not illustrated) to zoom-in and/or zoom-out, drives the lens unit 211 with a focus motor (not illustrated) to adjust a focus, and drives an iris motor to adjust an open and/or close amount of an iris (not illustrated) in the lens unit 211.

The CCD 213 is an imaging device driven by the CCD driving unit 217 to generate and output an electric signal corresponding to the optical image which is projected on the optical surface of the CCD 113 by the lens unit 211.

The CDS/AGC/ADC 217 performs signal processing such as correlated double sampling, auto gain controlling, A/D conversion, etc., on the electric signal which is output from the CCD 215.

The first memory 220 is a buffer that provides a recording space which is required by the DSP 230 to perform video signal processing. The first memory 220 may be a flash memory and/or a synchronous dynamic random access memory (SDRAM).

The video input unit 225 delivers an image from an external device to the DSP 230 and/or the back-end unit 250.

The DSP 230 performs signal processing on the video signal input from the photographing unit 210 or the video input unit 230, and outputs a resultant signal to the back-end unit 250. The DSP 230 uses the first memory 220 as a buffer to perform signal processing.

Specifically, the DSP 230 performs format conversion, a digital zoom to perform image scaling, Auto White Balance (AWB), and other signal processing operations on the video signal which is output from the photographing unit 210, and outputs a resultant signal to the back-end unit 250. The DSP 230 also controls the lens driving unit 217 to perform Auto Focus (AF), Auto Exposure (AE), etc.

The DSP 230 also compresses the video signal which is output from the photographing unit 210 into a file in a JPEG format, which is a suitable still image compression format, and outputs the JPEG format file to the back-end unit 250. The DSP 230 decompresses the JPEG format file which was input from the back-end unit 250 and outputs a generated video signal to the back-end unit 250.

The control unit 235 controls signal processing and/or signal delivery operation of the DSP 230 and signal processing and/or signal delivery operation of the back-end unit 250 in response to a user's operation command which is input through the operating unit 240.

The operating unit 240 may include the first photograph button 110 and the first zoom button 112 illustrated in FIG. 1, the second photograph button 118 and the second zoom button 120 illustrated in FIG. 1B, the shortcut buttons 126, 128 and 130, the display button 130, the easy Q button 142, the third photograph button 144, the photographing-mode select switch 146 and the power button 148 illustrated in FIG. 1C, the Q check button 152 and the copy button 154 illustrated in FIG. 1D, etc.

The second memory 245 is a buffer that provides a recording space which is required by the back-end unit 250 to perform signal processing. The second memory 245 stores graphics, menus, texts, etc., which are required by the back-end unit 250 to perform on screen display (OSD) processing. The second memory 245 may be a flash memory and/or SDRAM.

The back-end unit 250 serves to perform signal processing such as compression, decompression, play-back on a video signal and/or an audio signal.

Specifically, the back-end unit 250 encodes the video signal received from the DSP 230 to be suitable for the display and outputs it to the multi-LCD 270 or the video output unit 260.

Meanwhile, the back-end unit 250 may perform the OSD processing to insert graphics, menus, texts, etc., into the image received from the DSP 230, and may also output the image. Accordingly, the back-end unit 250 can read graphics, menus, texts, etc., which are stored as OSD information in the second memory 245 to perform OSD processing. The graphic which is contained in the image by the back-end unit 250 which performs the OSD processing, includes infant images that are graphics preferred by the infants. In other words, the graphics can include any images such as cartoons, animals, or other images which are attractive to infants.

Further, the back-end unit 250 compresses the video signal which is received from the DSP 230 and the audio signal which is input from audio processing unit 265, and sends the compressed file to the recording unit 290.

The back-end unit 250 decompresses the compressed file which is input from the recording unit 290 to restore a video signal and an audio signal, and outputs the restored video signal to the multi-LCD 270 and the restored audio signal to the audio processing unit 265.

During the outputting process, the restored video signal to the multi-LCD 270, the back-end unit 250 may perform the OSD processing on the restored image.

Further, the back-end unit 250 sends a file in a JPEG format which is input from the DSP 230 to the recording unit 290 and a file in a JPEG format which is input from the recording unit 290 to the DSP 230.

The USB interface 255 provides a USB communication interface between a USB device, such as a personal computer (PC), a printer, etc., and the digital camcorder. The video output unit 260 outputs the video signal from the back-end unit 250 to a connected external device (e.g., TV).

The audio processing unit 265 converts an analog audio signal input via an audio input device such as a microphone into a digital audio signal, and sends the digital audio signal to the back-end unit 250. The audio processing unit 265 also converts the digital audio signal which is output from the back-end unit 250 into the analog audio signal and outputs the analog audio signal to the speaker or a connected external device.

The multi-LCD 270 displays the image input from the back-end unit 250 on a display device, e.g., a Liquid Crystal Display (LCD). The multi-LCD 270 includes a main-LCD 273 which is driven by a main-LCD driving unit 271 to display an image, and a sub-LCD 277 which is driven a the sub-LCD driving unit 275 to display an image.

The main-LCD 273 corresponds to the main-LCD 124 illustrated in FIG. 1C, and the sub-LCD 279 corresponds to the sub-LCD 136 illustrated in FIG. 1C. The sub-LCD 136 has a screen smaller than the main-LCD 124. Further, an image which is displayed on the main-LCD 273 and an image which is displayed on the sub-LCD 277 may be identical to or different from each other.

The EEPROM 280 stores programs and data required for the back-end unit 250 to perform signal processing and/or signal delivery.

The recording unit 290 records the compressed file which is input from the back-end unit 250 on the recording medium. The recording unit 290 includes a disk loader 291, a memory card interface 293, a multi-slot 295, a memory controller 297, and a flash memory 299.

The disk loader 291 is disposed inside the disk cover 114 illustrated in FIG. 1B. The disk loader 291 records the compressed file which is input from the back-end unit 250 on the loaded disk. Further, the disk loader 291 reads the compressed file from the mounted disk, and outputs the compressed file to the back-end unit 250. The disk may be a compact disk (CD), a digital versatile disk (DVD), a blue-ray disk (BD), a high definition-DVD (HD-DVD), etc.

The memory card interface 293 records the compressed file input from the back-end unit 250 on the various memory cards mounted on the multi-slot 295. The multi-slot 295 is disposed inside the rear cover 150 illustrated in FIG. 1C.

Further, the memory card interface 293 reads compressed files from various mounted memory cards, and outputs the compressed files to the back-end unit 250. The memory cards may include a MultiMedia card (MMC), a Secure Digital (SD) card, etc.

The memory controller 297 records the compressed file which is input from the back-end unit 250 in the flash memory 299. Further, the memory controller 297 reads the compressed file from the flash memory 299 and outputs the compressed file to the back-end unit 250.

The control unit 235 can control the back-end unit 250 and the recording unit 290 so that the compressed file which was output from the back-end unit 250 is recorded in any one of the disk, the memory card, and the flash memory 299. Accordingly, the recording medium may be set by the user through a menu provided through OSD processing by the back-end unit 250.

The control unit 235 controls file copying between the recording mediums in the recording unit 290. Specifically, the control unit 235 controls copying files from the flash memory 299 to the disk or memory card, copying files from the memory card to the disk or flash memory 299, copying files from the disk to the memory card or flash memory 299, and other similar copying operations. In the current embodiment, copying to be performed may be set by the user on the menu provided by the back-end unit 250 which performs the OSD processing.

The copying of a file in the flash memory 299 which is read by the memory controller 297 includes copying to the disk via the back-end unit 250 and the disk loader 291, or copying to the memory card via the back-end unit 250 and the memory card interface 293.

The copying of a file in the memory card which is read via the multi-slot 295 by the memory card interface 293 includes copying to the disk via the back-end unit 250 and the disk loader 291, or copying to the flash memory 299 via the back-end unit 250 and the memory controller 297.

Further, the copying of a file in the disk which is read by the disk loader 291 includes copying to the memory card via the back-end unit 250 and the memory card interface 293, or copying to the flash memory 299 via the back-end unit 250 and the memory controller 297.

In the digital camcorder according to the present embodiment, either the same image or two different images can be displayed on the main-LCD 273 and the sub-LCD 277, respectively, as described previously.

The images which are displayed on the main-LCD 273 and the sub-LCD 277 are determined by the sub-photographing modes of the digital camcorder. These sub-photographing modes include an infant-photographing mode, an adult-photographing mode, a power-saving photographing mode and a normal photographing mode. The sub-photographing modes may be set by the user on the menu which is provided by the back-end unit 250 which performs the OSD processing.

The infant-photographing mode is suitable to photograph infants. In the infant-photographing mode, the main-LCD 273 and the sub-LCD 277 are both used. The adult-photographing mode" is suitable to photograph an adult. In the adult-photographing mode, the main-LCD 273 and the sub-LCD 277 are both used.

The power-saving photographing mode is suitable to photograph an object while minimizing power consumption. In the power-saving photographing mode, only the sub-LCD 277 is used. The normal photographing mode is suitable to normally photograph an object. In the normal photographing mode, only the main-LCD 273 is used.

Figure 3:
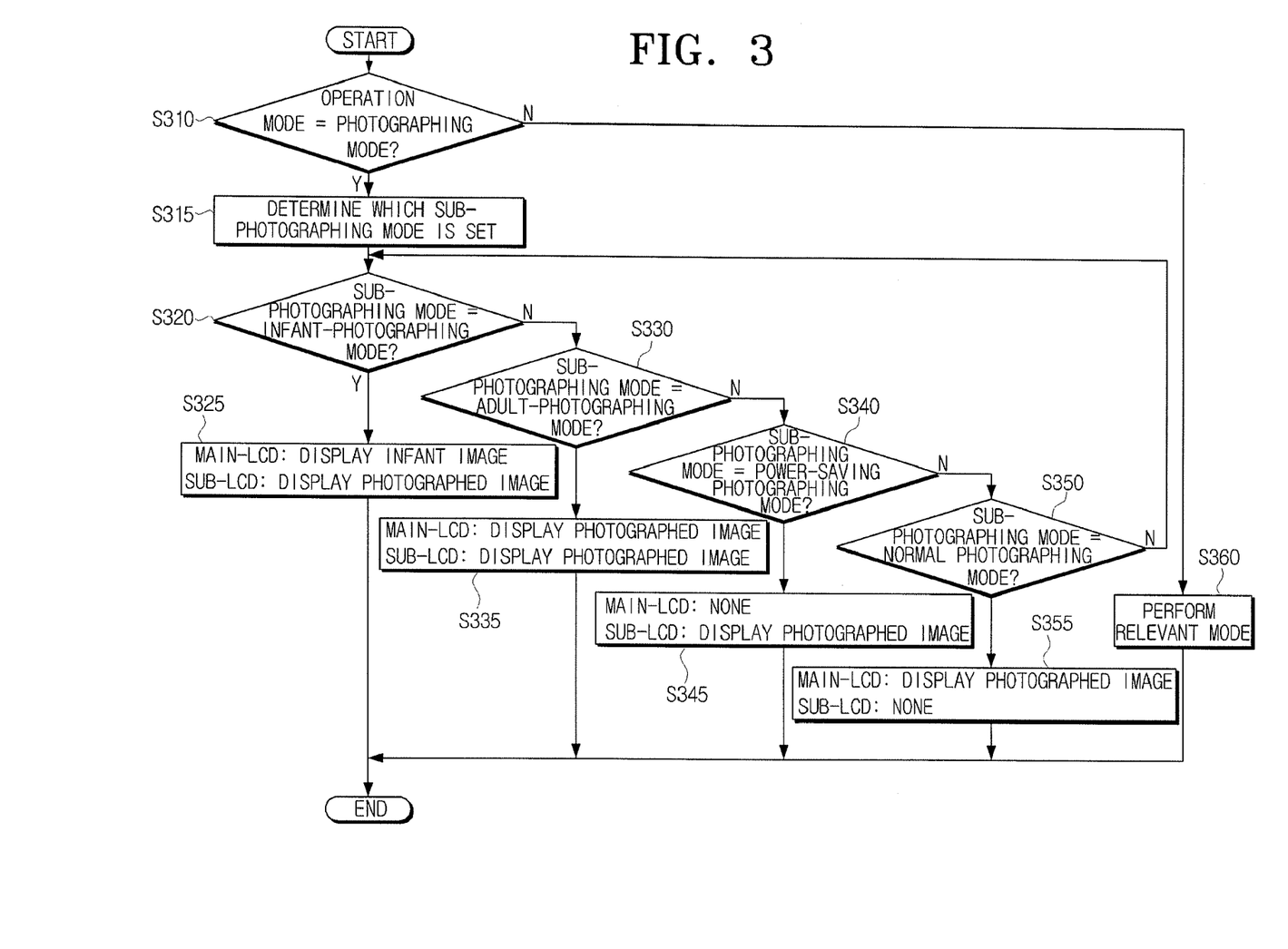
FIG. 3 is a flow chart illustrating a method of displaying an image in a digital camcorder according to another embodiment of the present general inventive concept.

A process in which either the same or two different images are displayed on the main-LCD 273 and the sub-LCD 277, respectively, according to sub-photographing modes will be described with reference to FIG. 3. FIG. 3 is a flow chart illustrating a method of displaying an image in a digital camcorder according to another embodiment of the present general inventive concept.

In operation S310, the control unit 235 determines whether the operation mode of the digital camcorder is a photographing mode.

If the operation mode is not the photographing mode in operation S310, i.e., if the operation mode is another mode (e.g., playback mode), the control unit 235 controls an operation of the digital camcorder to perform the another mode in operation S360.

If the operation mode is the photographing mode in S310, the control unit 235 determines which sub-photographing mode is set in operation S315. The sub-photographing mode may be set on a menu screen which is provided by the OSD processing in the back-end unit 250 by the user. A detailed description of the sub-photographing modes has been described above.

In operation S320, if the sub-photographing mode is the infant-photographing mode, the control unit 235 controls the main-LCD 273 to display an "infant image" thereon, and a "photographed image" on the sub-LCD 277 in operation S325.

Specifically, in operation S325, the control unit 235 controls the back-end unit 250 to apply the "photographed image", which is photographed by the photographing unit 210 and then signal-processed by the DSP 230, to the sub-LCD driving unit 275, such that the sub-LCD driving unit 275 displays the "photographed image" on the sub-LCD 277.

The control unit 235 also controls the back-end unit 250 to perform OSD processing to insert the "infant image" in the second memory 245 into the "photographed image" and to apply the resultant image to the main-LCD driving unit 271, such that the main-LCD driving unit 271 displays the "infant image" on the main-LCD 273.

Accordingly, the back-end unit 250 may adjust the screen size of the "infant image" which is OSD-processed into the "photographed image" to a screen size of the main-LCD 273, so that the "photographed image" is covered by the "infant image" (i.e., the "infant image" is fully displayed on the main-LCD 273).

As a result, since the "infant image" is displayed on the forward-facing main-LCD 273, as illustrated in FIG. 1D, the object, an infant will gaze into the digital camcorder to view the infant image, thereby more allowing a user to more easily photograph the infant.

If the sub-photographing mode is determined to be the adult-photographing mode in operation 330, the control unit 235 controls both the main-LCD 273 and the sub-LCD 277 to display the "photographed image" in operation S335.

Specifically, in operation S335, the control unit 235 controls the back-end unit 250 to apply the photographed image, which is photographed by the photographing unit 210 and then signal-processed by the DSP 230, to the main-LCD driving unit 271 and the sub-LCD driving unit 275, such that the main-LCD driving unit 271 displays the "photographed image" on the main-LCD 273 and the sub-LCD driving unit 275 displays the "photographed image" on the sub-LCD 277.

As a result, the "photographed image" is displayed on the forward-facing main-LCD 273, as illustrated in FIG. 1D, allowing an adult to view himself/herself while being photographed.

If the sub-photographing mode is determined to be a power-saving photographing mode in operation S340, the control unit 235 controls the sub-LCD 277 to display the "photographed image," and controls the main-LCD 273 to not display any image whatsoever in operation S345.

Specifically, in operation S345, the control unit 235 controls the back-end unit 250 to apply the photographed image, which is photographed by the photographing unit 210 and then signal-processed by the DSP 230, to the sub-LCD driving unit 275, such that the sub-LCD driving unit 275 displays the "photographed image" on the sub-LCD 277.

The control unit 235 also controls the back-end unit 250 so that the photographed image is not applied to the main-LCD driving unit 271, or blocks the power supply voltage from being supplied to the main-LCD driving unit 271 and the main-LCD 273 so that any image is not displayed on the main-LCD 273.

Consequently, images may be displayed on the smaller sub-LCD 277 instead of the larger main-LCD 273, thereby reducing power consumption in the digital camcorder.

If the sub-photographing mode is determined to be the normal photographing mode in operation S350, the control unit 235 controls the main-LCD 273 to display the "photographed image," controls the sub-LCD 277 to not display an image in operation S355.

Specifically, in operation S355, the control unit 235 controls the back-end unit 250 to apply the photographed image, which is photographed by the photographing unit 210 and then signal-processed by the DSP 230, to the main-LCD driving unit 271, such that the main-LCD driving unit 271 displays the "photographed image" on the main-LCD 273.

The control unit 235 controls the back-end unit 250 so that the photographed image is not applied to the sub-LCD driving unit 275, or blocks a power supply voltage from being supplied to the sub-LCD driving unit 275 and the sub-LCD 277 so that any image is not displayed on the sub-LCD 277.

The processes in which either the same or two different images are displayed on the main-LCD 273 and the sub-LCD 277 of the digital camcorder according to the sub-photographing mode have been, so far, described in detail in connection with the preferred embodiments.

In operation S325, the "infant image" may be displayed on the main-LCD 273 only when the main-LCD 273 faces forward, (i.e., to allow an infant to view an image which is displayed on the main-LCD 273). When the main-LCD 273 faces backward (i.e., to allow a photographer to view an image displayed on the main-LCD 273), the "photographed image" is displayed on the main-LCD 273, allowing the photographer to check the photographed image through the larger screen, main-LCD 273.

In the present embodiment, it is assumed that the "infant image" is recorded in the second memory 245, and is displayed on the main-LCD 273 by performing OSD-processing to contain the recorded "infant image" into the "photographed image". This, however, corresponds to a preferred embodiment of the present general inventive concept and thus the "infant image" may be displayed on the main-LCD 273 in a different way.

For example, the "infant image" may be recorded in a recording medium other than the second memory 245, and may be played back and displayed on the main-LCD 273. Specifically, an "infant image" which is recorded in the flash memory 299, an "infant image" which is recorded on the memory card, and an "infant image" which is recorded on the disk may be played back and displayed on the main-LCD 273.

When the "infant image" is recorded in the flash memory 299, the control unit 235 controls the back-end unit 250 to apply the "infant image" in the flash memory 299 which is read by the memory controller 297 to the main-LCD driving unit 271, such that the main-LCD driving unit 271 displays the "infant image" on the main-LCD 273.

When the "infant image" is recorded on the memory card, the control unit 235 controls the back-end unit 250 to apply the "infant image" in the memory card which is read via the multi-slot 295 by the memory card interface 293 to the main-LCD driving unit 271, such that the main-LCD driving unit 271 displays the "infant image" on the main-LCD 273.

When the "infant image" is recorded on the disk, the control unit 235 controls the back-end unit 250 to apply the "infant image" on the disk which is read by the disk loader 291 to the main-LCD driving unit 271, such that the main-LCD driving unit 271 displays the "infant image" on the main-LCD 273.

In the present embodiment, the "infant image" is not limited to any particular type of image. The "infant image" may be a still image, a moving image, or animation.

The term "infant image" is used to explain an intended application of the "infant image," which is to entice an infant to face a particular direction. Therefore, images other than the "infant image" may be displayed on the main-LCD 273. The present general inventive concept may be applied to a photographing apparatus other than the digital camcorder which is illustrated in the present embodiment.

As described above, according to the present general inventive concept, a photographing apparatus can provide a photographed image to several display devices, and can also provide different images to the several display devices. The provided image may be an image which is appealing to an infant.

Accordingly, infants may gaze directly into the photographing apparatus more readily, thereby allowing the user to more easily photograph the infants. Furthermore, the user can easily check the photographed image without requiring the user's eyes to be very close to photographing apparatus, and can more easily photograph an object, such as infants, located in a lower position in a comfortable upright and standing position.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A photographing apparatus to photograph and record an image, comprising:
   a lens unit;
   first, second, and third photograph buttons to input commands to photograph the image;
   first and second zoom buttons to input zoom commands corresponding to the image to be photographed;
   a recording unit to record the image photographed via the lens unit; and
   a battery to supply a power supply voltage to the photographing apparatus,
   wherein the first photograph button and the first zoom button are disposed on a front panel of the photographing apparatus, the second photograph button and the second zoom button are disposed on a top panel of the photographing apparatus, the third photograph button is disposed on a rear panel of the photographing apparatus, and the first photograph button functions to input commands to photograph a moving image and a still image.

2. The apparatus as claimed in claim 1, wherein:
   the second photograph button functions to input a command to photograph the still image, and
   the third photograph button functions to input a command to photograph the moving image.

3. The apparatus as claimed in claim 1, further comprising:
   a button to input a command to display information on at least one of an amount of the battery and an amount of a recording medium to record the photographed image.

4. The apparatus of claim 1, further comprising:
   first and second displays to display an image photographed via the lens unit,
   wherein the first and second displays are Liquid Crystal Displays (LCDs), and the second display is rotatable.

5. The apparatus as claimed in claim 4, wherein the first display is rotatable.

6. A photographing apparatus to photograph and record a moving image and a still image, comprising:
   a lens unit;
   first, second, and third photograph buttons to input commands to photograph the image;
   first and second zoom buttons to input zoom commands corresponding to the image to be photographed;
   a recording unit to record the image photographed via the lens unit;
   a mode selecting unit to select either a moving-image photographing mode to photograph the moving image or a still-image photographing mode to photograph the still image; and
   a battery to supply a power supply voltage to the photographing apparatus,
   wherein the first photograph button and the first zoom button are disposed on a front panel of the photographing apparatus, and the second photograph button and the second zoom button are disposed on a top panel of the photographing apparatus, the third photograph button is disposed on a rear panel of the photographing apparatus, and the first photograph button functions to input commands to photograph a moving image and a still image.

7. A photographing apparatus, comprising:
   a lens unit to photograph an object;
   first and second zoom buttons to perform zooming functions on the object;
   first and second photograph buttons to allow a user to perform the photographing of the object;
   a first display to display the photographed object as a first image; and
   a second display to display a second image,
   wherein the first photograph button functions to input commands to photograph a moving image and a still image.

8. The photographing apparatus of claim 7, wherein the first photograph button and the first zoom button are disposed on a front panel of the photographing apparatus, and the second photograph button and the second zoom button are disposed on a top panel of the photographing apparatus.

9. The photographing apparatus of claim 7, wherein the second image is an image of the photographed object.

10. The photographing apparatus of claim 7, wherein the second image is not an image of the photographed object.

11. The photographing apparatus of claim 7, wherein the second display is rotatable to face the object being photographed.

12. The photographing apparatus of claim 7, wherein the first display and the second display are both Liquid Crystal Displays (LCDs).

13. A photographing apparatus, comprising:
   a photographing unit to capture a still image and a moving image; and
   a plurality of photograph buttons to input a plurality of commands to the photographing unit,
   wherein each of the plurality of photograph buttons inputs a first command corresponding to the still image when pressed for a first time period and a second command corresponding to the moving image when pressed for a second time period.

14. The photographing apparatus of claim 13, wherein the second time period is longer than the first time period.

15. The photographing apparatus of claim 13, wherein the plurality of photograph buttons comprises a first photograph button and a second photograph button disposed on different sides of the photographing unit.

16. The photographing apparatus of claim 15, wherein the first photograph button and the second photograph button input the same commands to capture the still image.

17. The photographing apparatus of claim 15, wherein the first photograph button and the second photograph button input the same commands to capture the moving image.

* * * * *